US009908259B2

(12) United States Patent
Brown et al.

(10) Patent No.: US 9,908,259 B2
(45) Date of Patent: Mar. 6, 2018

(54) DUAL LOOP CONTROL OF CERAMIC PRECURSOR EXTRUSION BATCH

(75) Inventors: Dennis M Brown, Elmira, NY (US); Maryam Khanbaghi, Menlo Park, CA (US); Robert John Locker, Corning, NY (US); Wenbin Qiu, Wichita, KS (US); Kenneth Charles Sariego, Beaver Dams, NY (US); Conor James Walsh, Campbell, NY (US)

(73) Assignee: Corning Incorporated, Corning, NY (US)

( * ) Notice: Subject to any disclaimer, the term of this patent is extended or adjusted under 35 U.S.C. 154(b) by 1284 days.

(21) Appl. No.: 13/126,342

(22) PCT Filed: Oct. 30, 2009

(86) PCT No.: PCT/US2009/062727

§ 371 (c)(1),
(2), (4) Date: Sep. 12, 2011

(87) PCT Pub. No.: WO2010/051430

PCT Pub. Date: May 6, 2010

(65) Prior Publication Data

US 2012/0226375 A1 Sep. 6, 2012

Related U.S. Application Data

(60) Provisional application No. 61/110,367, filed on Oct. 31, 2008.

(51) Int. Cl.
*G05B 19/02* (2006.01)
*B28B 3/20* (2006.01)
*B28B 3/26* (2006.01)

(52) U.S. Cl.
CPC .............. *B28B 3/201* (2013.01); *B28B 3/269* (2013.01)

(58) Field of Classification Search
CPC .. B28B 1/00; B28B 3/20; B28B 3/201; B28B 3/269; B29C 47/00; B29C 35/007
(Continued)

(56) References Cited

U.S. PATENT DOCUMENTS 3,698,844 A * 10/1972 Grimm .......................... 425/144
4,102,958 A * 7/1978 Wertz ....................... B29C 47/92 264/40.6
(Continued)

FOREIGN PATENT DOCUMENTS

CN 1493440 5/2004
CN 1915632 2/2007
(Continued)

OTHER PUBLICATIONS

Chinese application No. 200980143608.7, dated Feb. 6, 2013, 'Notice on the First Office Action (PCT Application in the National Phase), pp. 1-9.
(Continued)

*Primary Examiner* — Charles Kasenge
(74) *Attorney, Agent, or Firm* — Jakub M. Michna

(57) ABSTRACT

A control strategy for producing high quality extrudates, including the steps of monitoring the temperature of a ceramic precursor batch by measuring the temperature of the batch material either directly or indirectly by measuring the temperature of a component of the extruder proximate to the die and transmitting the temperature data to an extrusion control system which comprises a master controller (106), at least one slave controller (110) and an optional supervisory controller. The supervisory controller determines batch temperature setpoint (102) in order to achieve the desired temperatures for extruding a certain type of batch material based on real time temperature inputs and stored parameters such as batch composition, process throughput, extruder
(Continued)

cooling capacity, and the like. The master controller (106) receives batch temperature setpoint from the supervisory controller, and monitors batch temperature and in turn regulates at least one slave controller (110) which controls the flow of coolant (112) to portions of an extruder (114) in contact with the batch material.

19 Claims, 8 Drawing Sheets

(58) Field of Classification Search
USPC ............ 700/109, 264, 425; 425/144; 264/28
See application file for complete search history.

(56) References Cited

U.S. PATENT DOCUMENTS

| | | | | |
|---|---|---|---|---|
| 4,272,466 | A * | 6/1981 | Harris | B29C 47/82 165/238 |
| 4,364,881 | A * | 12/1982 | Mizuno et al. | 264/40.7 |
| 4,721,589 | A * | 1/1988 | Harris | 264/40.1 |
| 4,767,301 | A * | 8/1988 | Volk, Jr. | B29C 47/92 425/14 |
| 4,850,839 | A * | 7/1989 | Cowley | B29C 47/368 425/142 |
| 5,149,193 | A * | 9/1992 | Faillace | B29C 47/82 264/349 |
| 5,614,137 | A | 3/1997 | Pandit et al. | |
| 6,276,929 | B1 | 8/2001 | Kuroda et al. | |
| 6,432,341 | B1 * | 8/2002 | Yamaguchi | B28B 3/206 264/177.1 |
| 6,488,873 | B1 * | 12/2002 | Bessemer | B26D 7/10 264/148 |
| 6,620,354 | B1 * | 9/2003 | Bessemer | B26D 7/10 264/148 |
| 6,627,127 | B1 | 9/2003 | Piovoso et al. | |
| 6,652,257 | B2 * | 11/2003 | Yamaguchi | B28B 3/206 425/144 |
| 6,755,564 | B2 * | 6/2004 | Eiva | B29C 47/827 366/145 |
| 6,802,996 | B2 * | 10/2004 | Tsuruta | B28B 3/20 264/177.11 |
| 6,852,257 | B2 * | 2/2005 | Eiva | B29C 47/82 264/40.6 |
| 7,090,480 | B2 * | 8/2006 | Tsuruta | B28B 3/20 425/144 |
| 7,101,166 | B2 * | 9/2006 | Yamaguchi et al. | 425/208 |
| 8,257,623 | B2 * | 9/2012 | Rector et al. | 264/40.1 |
| 2002/0014710 | A1 * | 2/2002 | Tsuruta | B28B 3/20 264/40.6 |
| 2002/0167102 | A1 * | 11/2002 | Yamaguchi | B28B 3/206 264/40.1 |
| 2003/0030166 | A1 * | 2/2003 | Eiva | B29C 47/82 264/40.6 |
| 2003/0211189 | A1 * | 11/2003 | Eiva | B29C 47/827 425/143 |
| 2005/0025849 | A1 * | 2/2005 | Tsuruta | B28B 3/20 425/144 |
| 2009/0166910 | A1 * | 7/2009 | Marshall et al. | 264/46.1 |
| 2010/0127419 | A1 * | 5/2010 | Malarkey et al. | 264/177.11 |
| 2010/0303945 | A1 * | 12/2010 | Citriniti et al. | 425/144 |
| 2012/0133065 | A1 * | 5/2012 | Caffrey et al. | 264/40.1 |
| 2012/0226375 | A1 * | 9/2012 | Brown et al. | 700/109 |

FOREIGN PATENT DOCUMENTS

| | | |
|---|---|---|
| JP | 53021209 A | 5/1979 |
| JP | S62-044404 | 2/1987 |
| JP | 2000-280217 | 10/2000 |
| JP | 2001-260116 | 9/2001 |
| JP | 2001-293711 | 10/2001 |
| JP | 2006-326923 | 12/2006 |
| JP | 2008-119891 | 5/2008 |
| JP | 2008-132648 | 6/2008 |

OTHER PUBLICATIONS

Japanese application No. 2011-534802, dated Jul. 30, 2013, "Notification of Grounds for Rejection", pp. 1-3.

Costin et al; "On the Dynamics and Control of a Plasticating Extruder"; Polymer Engineering and Science 22(17). pp. 1095-1106, 1982.

Pomerleau et al; "Real Time Optimization of an Extrusion Cooking Process Using a First Principles Model"; Proceedings of 2003 IEEE Conference on Control Applications; pp. 712-717, Jun. 2003.

Previdi et al; "Design of a Feedback Control System for Real-Time Control of Flow in a Single-Screw Extruder"; Control Engineering Practice, 14 (9), pp. 1111-1121, Sep. 2006.

* cited by examiner

DUAL LOOP CONTROL OF CERAMIC PRECURSOR EXTRUSION BATCH

CROSS-REFERENCE TO RELATED APPLICATIONS

This application claims the benefit of priority to U.S. provisional application No. 61/110,367, filed on Oct. 31, 2008.

FIELD

Various aspects relate generally to devices and methods for controlling the shape of ceramic precursor batch extrudates including honeycomb filter bodies by monitoring and controlling the temperatures to batch materials forced through an extruder die plate.

BACKGROUND

Localized imperfections in the shape of a ceramic-forming extruded body can occur.

SUMMARY

One aspect of the invention is a method for controlling the shape of a ceramic precursor extrudate, the method comprising the steps of: forming an extrudate by extruding ceramic precursor batch material through at least one barrel of an extruder and an extruder die disposed at the outlet of the extruder, a barrel temperature capable of being regulated by a barrel coolant flow; measuring the batch material temperature of the material within the extruder upstream of the die; measuring the barrel temperature; determining a batch material temperature setpoint; determining a barrel temperature setpoint based on the batch material temperature and the batch material temperature setpoint; determining a barrel coolant flow setpoint based on barrel temperature setpoint and the measured barrel temperature; and regulating the heat transfer between the barrel and the batch material within the extruder by adjusting the barrel coolant flow.

In some embodiments, the batch temperature can be measured by inserting a probe into the batch to directly measure, depending upon how the probe is positioned, either or both the batch core and/or batch skin temperature. In other embodiments, the batch temperature is measured indirectly be measuring the temperature of a surface of the extruder proximate to the die and that is in either direct or indirect contact with the batch material. In some embodiments, the surface of the extruder proximate to the die is positioned between the last barrel of the extruder body and before the die. Preferably, this surface is not directly supplied with coolant.

In some embodiments, heat transfer from the extruder barrel to the batch material is regulated at a rate sufficient to maintain a difference between the extrudate core temperature and the skin temperature within an extrudate temperature range. In some embodiments, the temperature range is selected such that it produces an extrudate with a uniform shape resulting in a larger number of error free extruded products and a reduced need for product reworking. In some embodiments, the difference the methods and device disclosed herein produce a temperature difference between the extrudate core temperature and the skin temperature of not less than about 1° C. and not more than about 3° C.

In some embodiments disclosed herein, a method is provided of regulating the amount of heat transferred either into or out of the batch material sufficient to maintain a core temperature of the extrudate within a target first temperature range. In some embodiments, the core temperature of the extrudate is not less than 31° C. and not more than 37° C. In some embodiments, the heat transfer into or out of the batch material is regulated so as to maintain a skin temperature of the extrudate to be within a second target temperature range. In some embodiments, the skin temperature is not less than 27° C. and not more than 34° C.

In some embodiments disclosed herein, a method is provided of regulating the amount of heat transferred into or out of a batch material sufficient to cause the flow rate of the extrudate exiting a center portion of the die to be greater than a flow rate of the extrudate exiting the outer portion of the die. In some embodiments, this results in the formation of a substantially uniform extrudate face, resulting in less waste and extrudates of better quality. In some embodiments, the use of these methods for controlling extrudate core and skin temperatures may also obviate the need to add a die mask to the face of the die plate in order to compensate for imperfections in the die plate that lead to unacceptable defects in the extrudate.

In some embodiments disclosed herein, a method is provided of regulating heat transfer into or out of the batch material from the extruder barrel assembly sufficient to cause the flow rate of the extrudate exiting a center portion of the die to be lesser than the flow rate of the extrudate exiting an outer portion of the die. In some embodiments, this results in the formation of a substantially uniform extrudate face, resulting in less waste and extrudates of better quality. This method may also obviate the need to add a die mask to the face of the die plate to compensate for imperfections in the die plate that lead to unacceptable defects in the extrudate.

In some embodiments disclosed herein, a method is provided of controlling the shape of a ceramic precursor extrudates, comprising the steps of forming an extrudate by extruding ceramic precursor batch material through a barrel of an extruder and through an extruder die disposed at the outlet of the extruder wherein the barrel temperature setpoint is an output of a master controller, and the batch material temperature and the batch material temperature setpoint are provided as inputs to the master controller. In some embodiments, the setpoint of cooling flow rate is an output of a slave controller and the barrel temperature setpoint and the measured barrel temperature provide inputs to the slave controller. In some embodiments, the batch material temperature setpoint is an output of a supervisory controller. The supervisory controller receives process inputs.

In other embodiments disclosed herein, the process inputs comprise parameters such as the composition of the batch material, feed rate of the batch material, extrudate geometry or die characteristics, and the like or combinations thereof. The supervisory controller may provide the batch material temperature setpoint, master controller parameters, slave controller parameters or barrel weighting factors, or combinations thereof.

In one aspect disclosed herein, the extruder is provided with a plurality of barrel coolant flows. In some embodiments, the batch material temperature is determined by measuring the temperature of a structure proximate the batch material within the extruder. The batch material temperature setpoint is determined from measurements of a core temperature and a skin temperature of the extrudate.

In another aspect disclosed herein, a ceramic precursor extrudate control system comprises: an extruder comprised of a barrel of an extruder and an extruder die disposed at the outlet of the extruder; a barrel cooling device capable of providing a barrel coolant flow to the barrel; a batch material temperature sensor disposed within the extruder upstream of the die and capable of delivering a batch material temperature; a barrel temperature sensor capable of delivering a barrel temperature; a master controller capable of receiving the batch material temperature and the batch material temperature setpoint as inputs, and capable of delivering a barrel temperature setpoint; and a slave controller capable of receiving the barrel temperature setpoint and the measured barrel temperature as inputs, and capable of delivering a coolant flow setpoint. In one embodiment, the control system further includes a supervisory controller capable of delivering the batch material temperature setpoint to the master controller.

Additional features and advantages of the invention will be set forth in the detailed description which follows and, in part, will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention and are intended to provide an overview or framework for understanding the nature and character of the invention as it is claimed. The accompanying drawings are included to provide a further understanding of the invention and are incorporated into and constitute a part of this specification. The drawings illustrate some aspects and embodiments of the invention and, together with the description, serve to explain the principles and operations of the invention.

DETAILED DESCRIPTION

Figure 1:
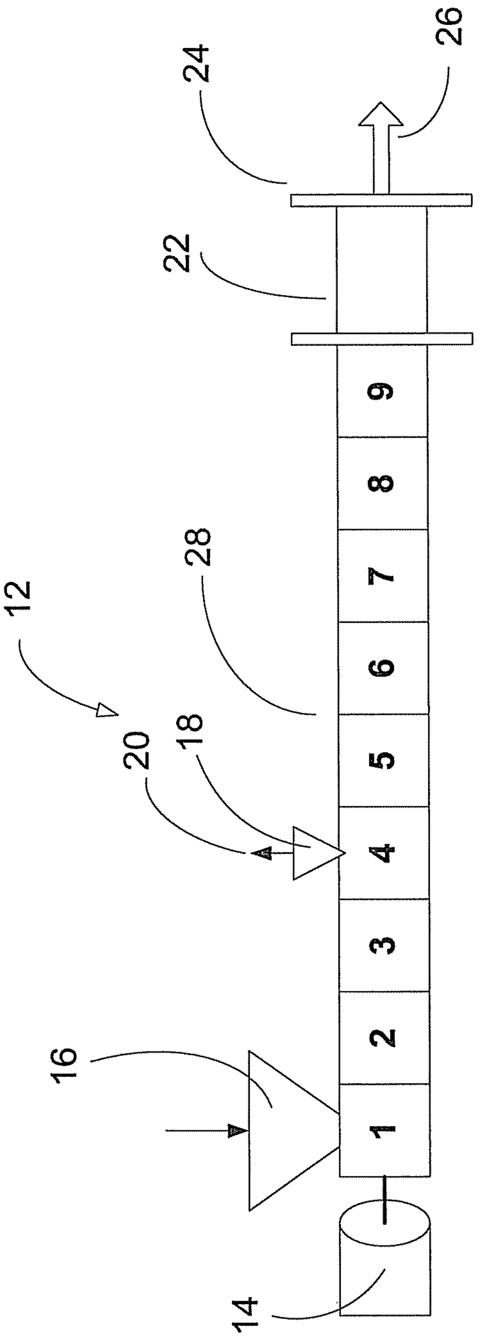
FIG. 1 is a schematic of an extruder complete with a motor for turning a screw (not shown), a material input funnel, a vacuum vent, a multiplicity of cooling barrels, a front end, and a die.

Some control over the dimensions of extruded batch materials, including aluminum titanate compositions, can be achieved by the use of metal "masks" or "shrink plates" to define the part size and shape as the extrudate exits the forming die. The required mask size is determined by the final part dimensional specifications and by the amount of anticipated part shrinkage that is induced as a result of drying and firing the extruded part. Some localized imperfections in the shape of an extruded part can be corrected by utilizing a mask that compensates for and corrects the imperfections. For example, if the extruded part contains a bump on its surface, a compensated mask with an indentation at the same location as the bump is made and installed to correct the imperfection.

Also, metal dies that are used to form extruded ceramic-forming logs or parts can exhibit a certain amount of die to die flow front variability in which material at the center may flow faster than material at the periphery, the flow front can be flat, or material at the periphery may flow faster than material at the center. If the flow front is not acceptable, the die may need to undergo rework to change the die until it produces an acceptable flow front.

Although batch materials may be extruded under controlled temperatures, such as by controlling the barrel temperature of an extruder, an indirect, single loop method of batch temperature control can be difficult to regulate, and under many conditions, may provides only limited control over the temperatures of the batch materials being extruded. Some aspects disclosed herein provide devices and process control methods that enable finer control over the temperature of extruded batch materials.

Reference will now be made in detail to embodiments of the invention, examples of which are illustrated in the accompanying drawings. Whenever possible, the same reference numerals will be used throughout the drawings to refer to the same or like parts.

One embodiment includes a method for controlling the shape of a ceramic precursor extrudate. Referring to FIG. 1, this method comprises the steps of forming an extrudate by extruding a ceramic precursor batch material (26) through at least one barrel (28) or a series of barrels (e.g., 1, 2, 3, 4, 5, 6, 7, 8, 9) of an extruder assembly (12) and through an extruder die (24) disposed at the outlet of the extruder (22). The temperature of at least one barrel of the extruder is regulated by barrel coolant flow. A typical extruder includes a motor (14) to drive an extruder screw (not shown), a funnel (16) to feed material into the extruder assembly, and a vacuum vent (18) to remove gas (20) from the batch. The method further includes the steps of measuring the temperature of batch material within the extruder. Preferably, the temperature of the batch material is measured in the extruder upstream of the die, and even more preferably closer to the die than to portions more to the rear of the extruder, such as where the batch material enters the extruder or where the batch material is worked by an extruder screw. In one embodiment, upstream of the die is measured as well as the barrel temperature. In some embodiments, the barrel temperature is measured at a barrel that is supplied with a cooling source such that the temperature of the barrel can be changed in response to the temperature of the batch material. The batch material temperature can be determined and compared to a setpoint for the batch material temperature stored within the device. This information can be used to regulate the flow of coolant to at least one barrel in the extruder body such that the temperature of the batch material is or at least starts to converge on the batch setpoint temperature.

In one embodiment, the batch temperature can be measured by inserting a probe into the batch to directly measure, depending upon how the probe is positioned, either or both the batch core and/or batch skin temperature. Devices that can be used to directly measure the temperature of the batch material include thermo-couples and even conventional thermometers. Data collected by these devices are either manually or automatically input into the temperature controller system. In still another embodiment, the batch temperature is measured indirectly by measuring the temperature of the batch material. Devices that can be used to make this type of measurement include, for example, infrared heat detectors or a temperature sensor attached to a surface of the extruder that is in contact with the batch material. In one embodiment, the batch material temperature is measured indirectly by measuring the temperature of a surface of the extruder located in proximity to the die plate of the extruder. Referring again to FIG. 1, the temperature can be measured after the last barrel of the extruder body and before the die.

In one embodiment, a relationship between the indirect temperature measured for a given ceramic precursor formulation and a temperature directly measured is determined and then used to infer the temperature of the batch material including, for example, the batch core temperature by indirectly measuring the temperature of the batch and using the known relationship for the two temperatures to estimate the batch material's core temperature.

In another embodiment, heat transfer from the extruder barrel to the batch material (or from the batch material to the barrel) is regulated at a rate sufficient to maintain a desirable difference between the batch material's core temperature and its skin temperature. The term "heat transfer," as used herein, includes cooling the batch material's temperature by transferring heat from the material to at least one barrel of the extruder. In one embodiment, the temperature range is selected such that it produces an extrudate with a uniform shape, resulting in a larger number of error free products and a reduced need for product reworking. In one embodiment wherein the difference between the core temperature and the skin temperature of the extrudate is not less than about 1° C. and not more than about 3° C., the term "about" is used to denote a value plus or minus 20 percent of the value, (e.g., about 1° C. includes the range of 0.8° C. to 1.2° C.).

One embodiment is a method of regulating the heat transfer into the batch material sufficient to maintain a core temperature of the extrudate within a target first temperature range. In one such embodiment, the core temperature of the extrudate is not less than 31° C. and not more than 37° C. In one embodiment, the heat transfer to the batch material is regulated so as to maintain a skin temperature of the extrudate to be within a second target temperature range. In one such embodiment, the skin temperature is not less than 27° C. and not more than 34° C. In another embodiment, the skin temperature is not less than 27° C. and not more than 35° C.

One embodiment is a method of regulating the amount of heat transferred to a batch material sufficient to cause the flow rate of the extrudate exiting a center portion of the die to be greater than a flow rate of the extrudate exiting the outer portion of the die. In one embodiment, this results in the formation of a substantially uniform extrudate face, resulting in less waste and extrudates of better quality. The use of this method may also obviate the need to add die mask to the face of the die plate to compensate for imperfections in the die plate that lead to unacceptable defects in the extrudate.

Still another embodiment is a method of regulating heat transfer to the batch material from the extruder barrel assembly sufficient to cause the flow rate of the extrudate exiting a center portion of the die to be lesser than the flow rate of the extrudate exiting an outer portion of the die. In one embodiment, this results in the formation of a substantially uniform extrudate face, resulting in less waste and extrudates of better quality. The use of this method may also obviate the need to add die mask to the face of the die plate to compensate for imperfections in the die plate that lead to unacceptable defects in the extrudate.

Yet another embodiment is a method of controlling the shape of a ceramic precursor extrudate, comprising the steps of forming an extrudate by extruding ceramic precursor batch material through a barrel of an extruder and through an extruder die disposed at the outlet of the extruder wherein the barrel temperature setpoint is an output of a master controller, and the batch material temperature and the batch material temperature setpoint are provided as inputs to the master controller. In one embodiment the setpoint is an output of a slave controller, and the barrel temperature setpoint and the measured barrel temperature provide inputs to the slave controller. In another embodiment the setpoint of a cooling flow rate, and/or valve position, is an output of a slave controller, and the barrel temperature setpoint and the measured barrel temperature provide inputs to the slave controller. In one embodiment, the batch material temperature setpoint is an output of a supervisory controller. The supervisory controller receives process inputs.

In still another embodiment, the process inputs comprise parameters such as the composition of the batch material, feedrate of the batch material, extrudate geometry, die characteristics and the like, or combinations thereof. In one embodiment, the supervisory controller provides the batch material temperature setpoint, master controller parameters, slave controller parameters, barrel weighting factors and the like, or combinations thereof.

In one aspect disclosed herein, the extruder is provided with a plurality of barrel coolant flows. In one embodiment, the batch material temperature is determined by measuring the temperature of a structure proximate to the die and within the extruder. The batch material temperature setpoint may be determined from measurements of a core temperature and a skin temperature of the extrudate.

In another aspect disclosed herein, a ceramic precursor extrudate control system comprises: an extruder comprised of a barrel of an extruder; an extruder die disposed at the outlet of the extruder; a barrel cooling device capable of providing a barrel coolant flow to the barrel; a batch material temperature sensor disposed within the extruder upstream of the die and capable of delivering a batch material temperature; a barrel temperature sensor capable of delivering a barrel temperature; a master controller capable of receiving the batch material temperature and the batch material temperature setpoint as inputs, and capable of delivering a barrel temperature setpoint; and a slave controller capable of receiving the barrel temperature setpoint and the measured barrel temperature as inputs, and capable of delivering a coolant flow setpoint. In one embodiment, the control system further includes a supervisory controller capable of delivering the batch material temperature setpoint to the master controller.

Figure 2:
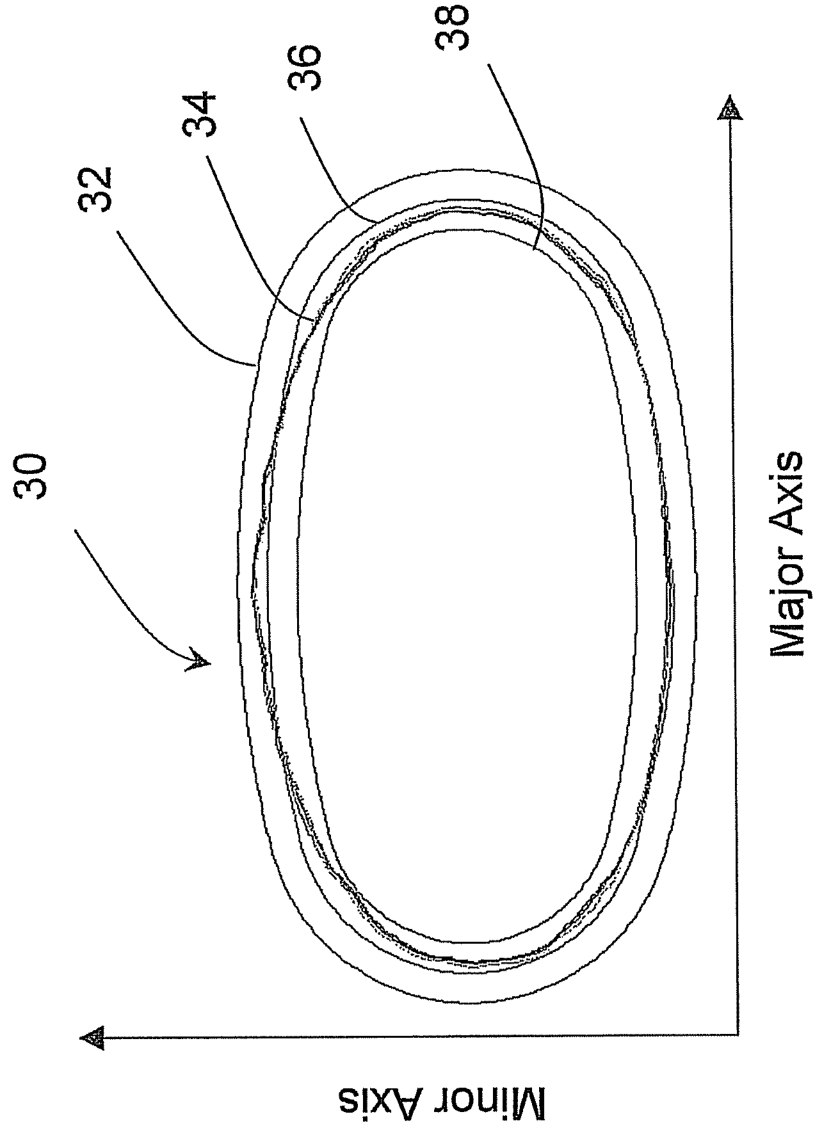
FIG. 2 is a 10× view of a contour plot showing the shape of an extrudate formed at a core temperature of 33° C. and a skin temperature of 31° C.
Figure 3:
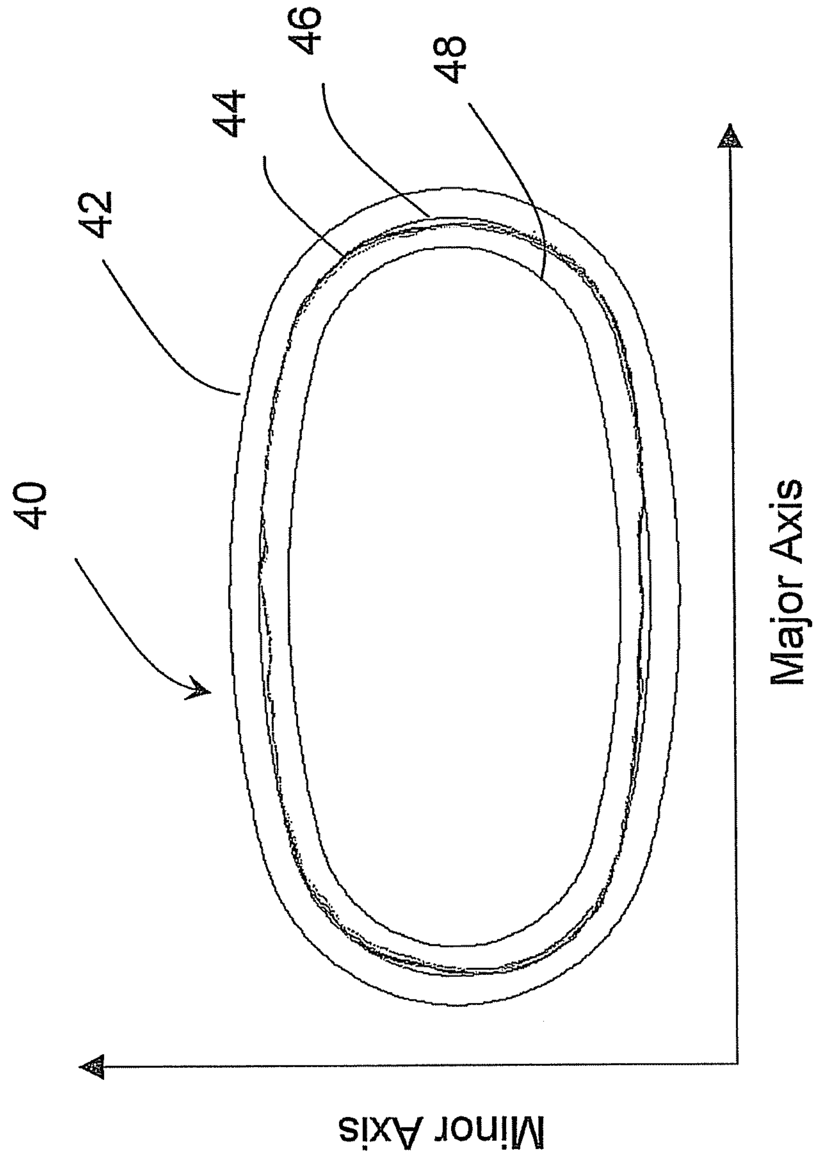
FIG. 3 is a 10× view of a contour plot showing the shape of an extrudate formed at a core temperature of 36° C. and a skin temperature of 33° C.

For most, if not all, ceramic precursor batch materials that can be extruded to form an extrudate there is an optimal core and skin temperature. Extrudates formed at or near the optimal temperature for a given batch formulation will generally have fewer imperfections than those formed at sub-optimal temperatures. Referring now to FIGS. 2 and 3, these are contour plots of extrudates formed from Aluminum Titanate magnified 10× to illustrate the variability in the shapes of the extrudates. Referring now to FIG. 2, this contour plot (30) shows a noticeable drift of material (34) towards the minor axis of the plot away from the ideal contours 32, 36 and 38 when the extrudate was formed by passing the batch material through a die at core temperature of 33° C. and a skin temperature of 31° C. This is indicative of an "A" flow front. Referring now to FIG. 3 is a contour plot (40) generated when the same Aluminum Titanate batch material was extruded through the same die at a batch material core temperature of 36° C. and a batch material skin temperature of 33° C. The contour (44) of the extrudate formed under these batch temperatures is more even (i.e., less material accumulates along the minor axis of the contour) and more closely approximates the ideal extrudate shapes 42, 46 and 48. These plots illustrate that extrudate core and skin temperatures have a significant impact on the shape of the extrudate.

Still another imperfection introduced into extrudates by forming them under substantially sub-optimum core and skin temperatures is the formation of extrudates with "C" fronts, a disproportional accumulation of material along the major axis of the contour plot (example not shown). Extrudates with either "A" or "C" front imperfection can be avoided by properly controlling the extrudate's core and skin temperatures. Accordingly, controlling the core and skin temperatures of a given ceramic precursor batch formulation below its gel point can have a significant effect on the shape of the extrudate.

Various aspects/embodiments relate to devices and methods for maintaining batch material temperatures within a specific operating window of extrudate skin and core temperatures that improve the shape of the extruded part. For example, when extruding certain batch materials such as some formulations of aluminum titanate ($Al_2TiO_5$), the core temperatures of the extrudate are ideally between about 31° C. and about 37° C. Extrudate skin temperatures are ideally between about 27° C., and about 34° C. may also be desirable. For some formulation of this material, this temperature produces high quality extrudates. In some instances, a skin to core temperature delta of 1° C. to 3° C. is desired in the extruded part.

Figure 4:
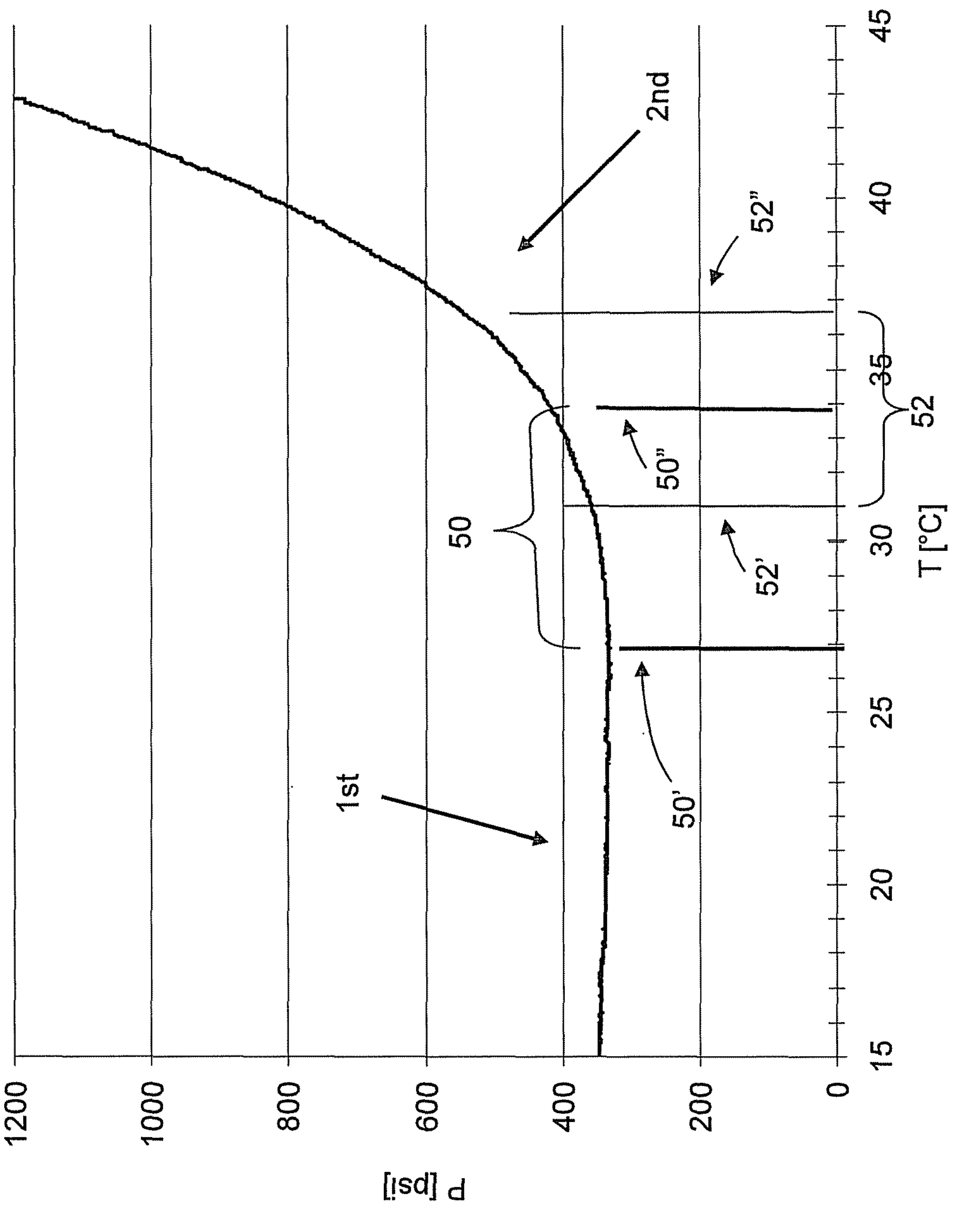
FIG. 4 is a graph of batch material temperature versus pressure required to force the material through an outlet, illustrating that for a given ceramic precursor batch formulation, a selective temperature range of skin and core temperatures over which the viscosity of the material can be readily impacted by changes in temperature.

The target batch material skin and core extrusion temperatures can be determined for a batch formulation by measuring the effect of batch material skin and core temperatures on viscosity (see, for example, one embodiment illustrated in FIG. 4) according to a capillary rheology test. FIG. 4 is a plot of pressure (a measure of viscosity) as a function of temperature for a particular batch material. The relationship is related to the formulation of the batch and is influenced by factors such as the type and amount of binder in the formulation, moisture content, basic components, and the like.

Still referring to FIG. 4, the target skin temperature is preferably kept within outer peripheral temperature range (50) and the target core temperature is preferably kept within core temperature range (52). For the embodiment illustrated in FIG. 4, between about 27° C. to about 36° C. the viscosity of this formulation is very sensitive to change in batch temperature. Most ceramic precursor batch materials will also show a range of temperatures over which a small change in temperature may induce a large change in viscosity. This temperature range can be determined before a given material is used to form an extrudate and the extruder parameters set accordingly. Some embodiments disclosed herein include determining the proper temperature range at which to extrude a given formulation based on studying the effect of temperature on the rheology of a given material. These methods can be used to control the shape of extrudate flow fronts for under some condition. In some embodiments utilizing a batch comprising cordierite and/or aluminum titanate forming materials with a cellulosic binder, we have found that the temperature difference of the core temperature minus the skin temperature is between −10° C. and +15° C. to achieve proper extrudability through honeycomb dies. We have also found advantageous to increase the core temperature relative to the skin temperature when the temperature of the batch material is in or near the higher slope region of the pressure v. temperature curve (FIG. 4).

Some embodiments of the present disclosure include devices and methods for improving the shape of extruded parts using existing temperature controls on the extruder. We observed that barrel only temperature control is not always sufficient to control the temperature of batch materials inside of the extruder barrels. Barrel temperature control can only directly control that the temperature of the barrel itself, and batch temperature is controlled indirectly through the exchange of heat between barrel steel and batch materials extruded through those barrels. Due in part to the variation of properties of incoming batch materials, the heat exchange behaviors between barrels and batch materials can dynamically change. Factors influencing the temperature difference between barrels and batch materials include the efficiency of heat exchange, the residence time for batch materials staying contact with barrels, ambient temperatures, etc. Thus, controlling barrel temperature alone to constant setpoints cannot always maintain constant batch temperature for an extrusion process subject to various process disturbances, including variations coming from the properties of raw materials, hardware wear, batch compositions, ambient conditions, and the like.

Still another embodiment disclosed herein provides a new control system for controlling extrudate temperature, e.g., a dual loop system that adjust barrel cooling based on the batch material's temperature. These methods provide better control of batch extrusion temperatures at the die face and enable the formation of extrudates with more uniform shape.

One advantage of better batch material temperature control is that it may obviate the need to rework extruder dies to correct minor imperfections in the dies that can make for imperfect extrudates. Still another advantage of improved batch material temperature control is that it may obviate the need for masks, which are sometimes used to correct small defects in the die plate that otherwise introduce imperfects into the extruded objects. Currently, die masks are required for a wide range of shrinkage targets, with each shrinkage target requiring all compensation options. Masks are costly, and a mask may last only 24 hours or so before it wears out and must be replaced. In addition, die reworking and mask fitting increases extruder down time, reducing run efficiency. Proper selection and control of extrudate temperatures enables the utilization of some dies that include undesirable flow front characteristics, thereby eliminating costly reworking of the dies and/or the fabrication and fitting of correctional masks to the die face is avoided. Reducing or eliminating the need for corrective masks reduces the complexity and expense of producing high quality extruded objects such as honeycomb filter bodies.

Material temperature is a critical process variable, and its variation is directly related to the variation of batch rheology which determines the stability of extrusion process and the quality of extrudates. For example, methylcellulose is used in some ceramic precursor batch formulations as a temporary binder to aid in the extrusion process. The viscosity of a typical methylcellulose formulation as it is heated to its gel temperature changes. In order maintain the temperature of such formulation under its gel temperature and to control its viscosity and rheology, it is desirable to tightly control the batch material's core and skin temperatures. Accordingly, one aspect disclosed herein relates to a process control strategy for controlling material temperature in a ceramic extrusion process.

Figure 5:
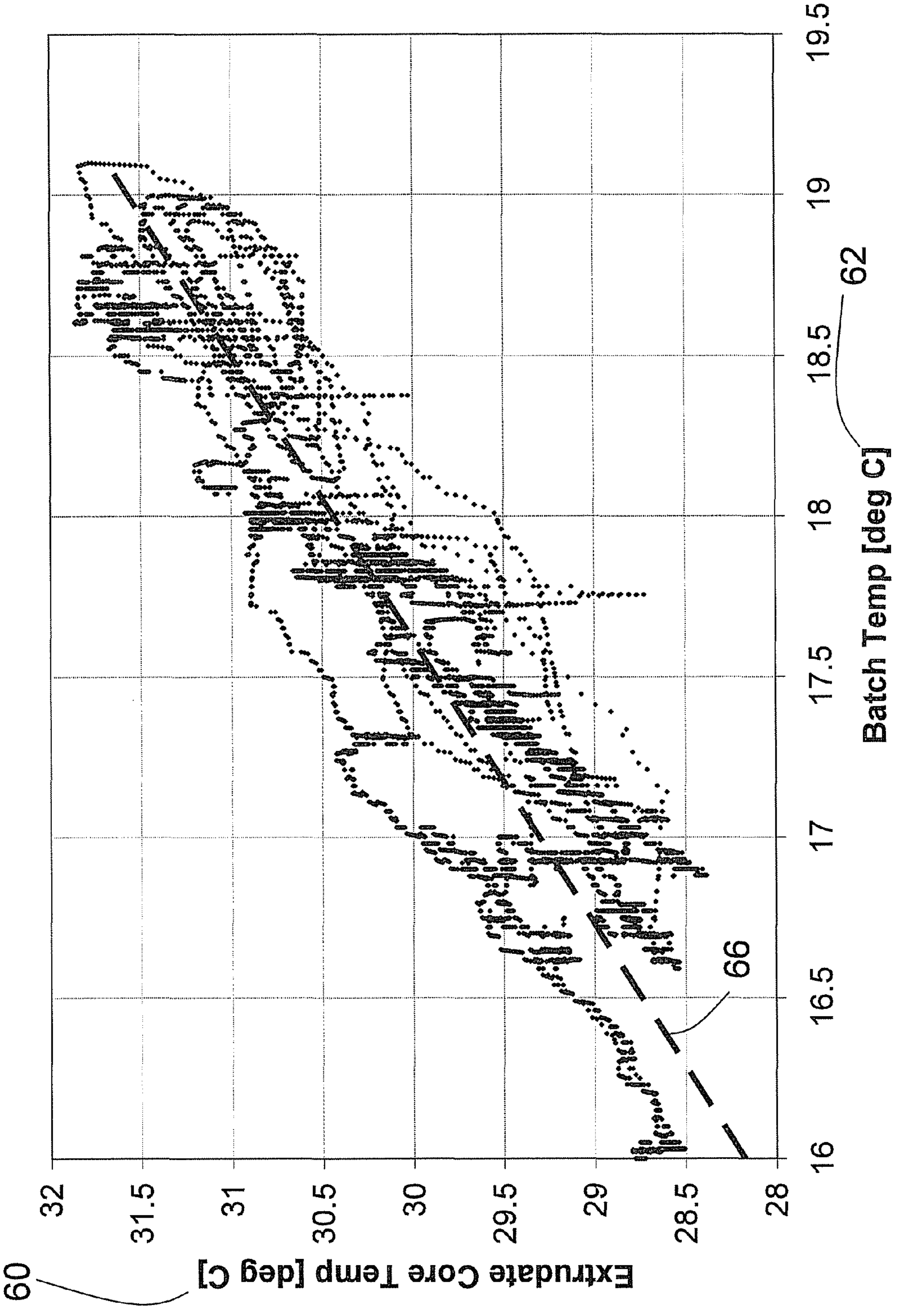
FIG. 5 is a graph of batch material temperature versus extrudate core temperatures, including a fitted line illustrating the relationship between the two temperatures.
Figure 8:
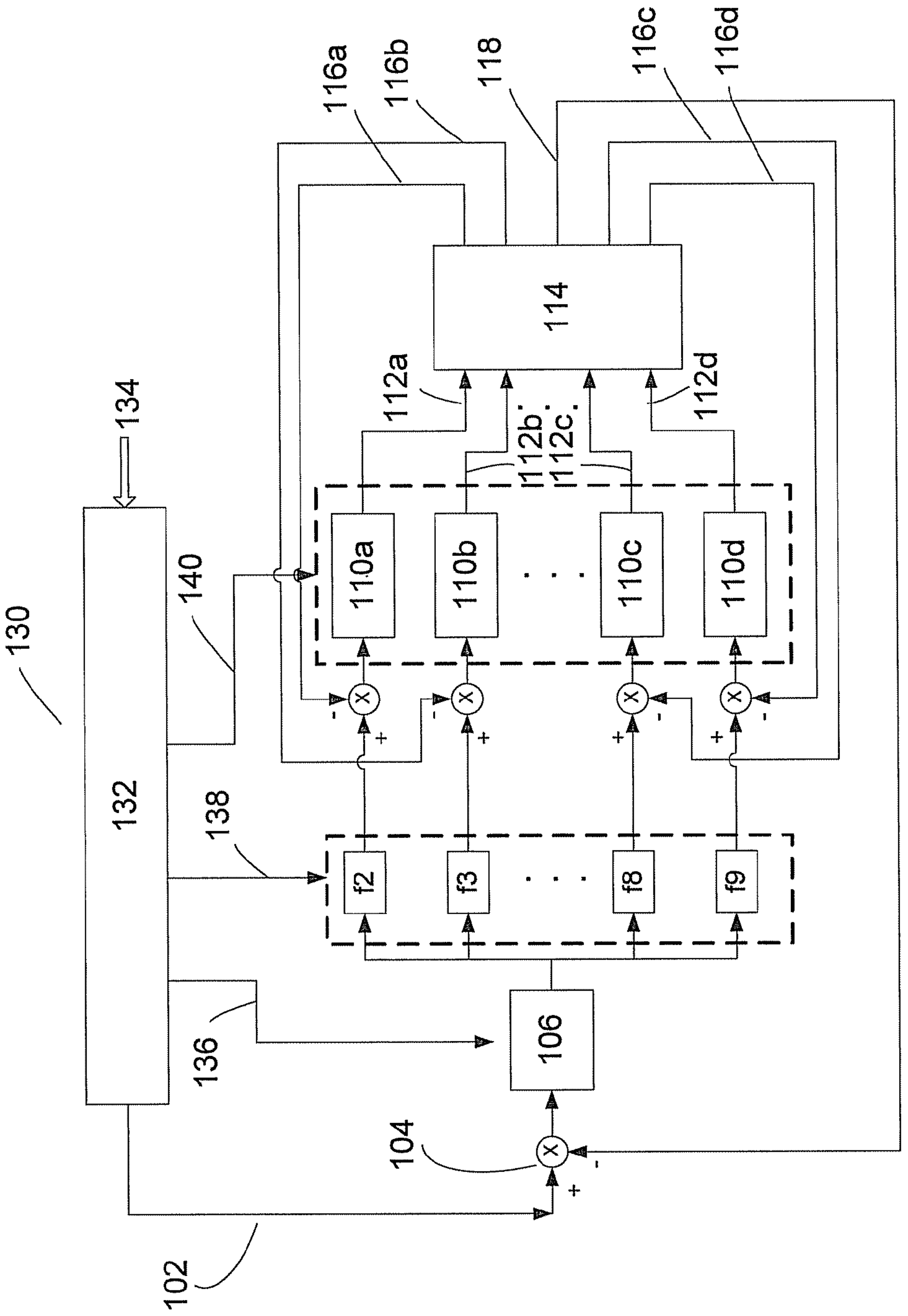
FIG. 8 is a diagram illustrating a temperature control architecture discussed herein, which includes a supervisor that controls both the master and slave control loops.

Referring now to FIG. 5, extrudate core temperature (60) and batch temperature (62) were measured and plotted for a given ceramic precursor batch formulation and a given extruder set-up; the batch temperature correlates well with extrudate core temperature. For this particular batch, a line (66) fit to the data collected for both temperatures had a slope of 1.13, an intercept of 10.08, and a $R^2$ value of about 0.8226. These results indicate that extrudate core temperature and batch temperature can be correlated with one another. Referring now to FIG. 8, once the relationship between these two temperatures is determined, an extruder supervisory controller (132) can be programmed to process batch temperatures even those collected indirectly and use these temperatures to infer the batch material's core temperature and regulate the slave (110*a*, 110*b*, 110*c*, 110*d*) and master (106) controllers accordingly to maintain an extrudate's skin and core temperatures within a specific temperature range.

Figure 6:
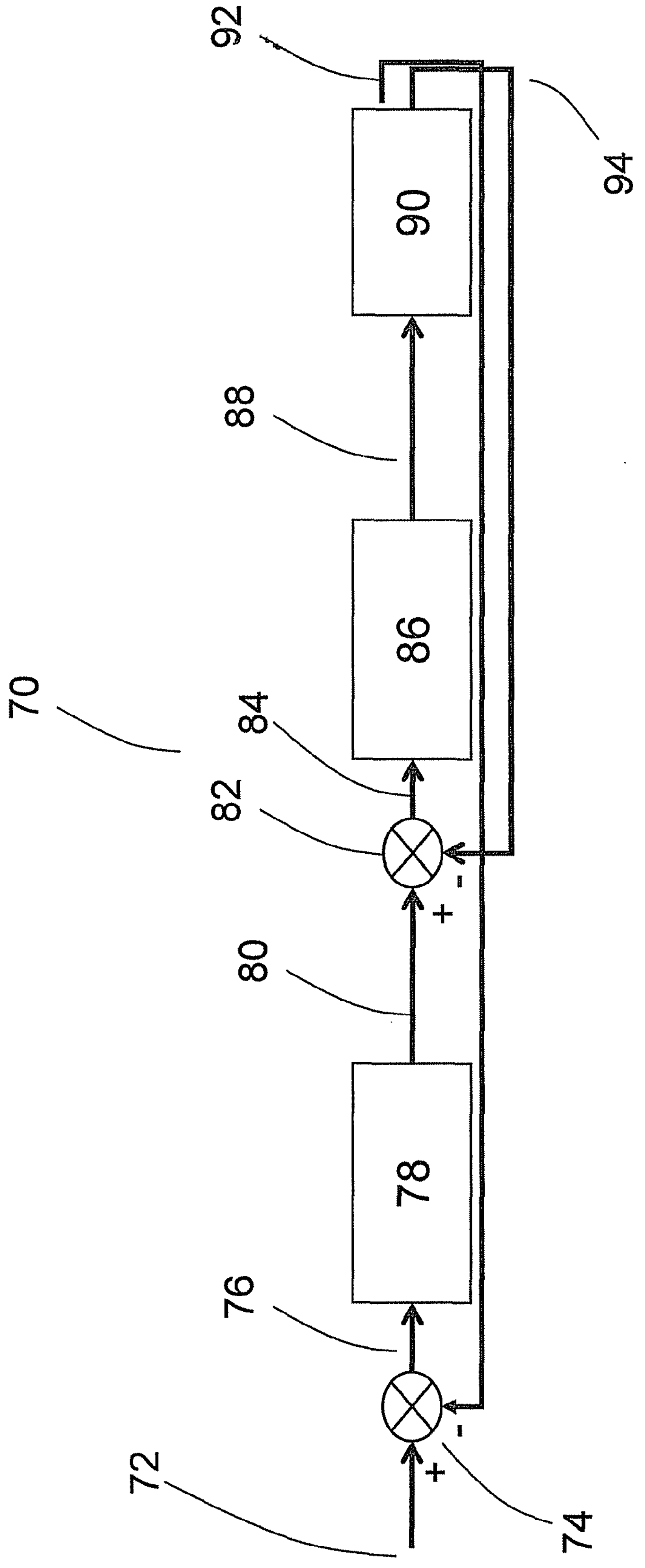
FIG. 6 is a schematic diagram of one embodiment disclosed herein: a dual loop temperature control strategy comprising a slave controller that regulates coolant flow to at least one barrel of an extruder; and a master controller that receives data on the batch material temperature and controls the slave controller so as to adjust the batch material temperatures to a desired batch temperature.

Referring now to FIG. 6, one embodiment is an extrudate based temperature control strategy (70) that uses a dual-loop control strategy. Wherein the inner loop (slave controller 86) controls the barrel temperature by adjusting cooling flow rate (88) or cooling valve opening and closing. The outer loop (master controller 78) controls the batch material extrudate temperature by adjusting the inner loop barrel temperature setpoints. Batch material temperature responds well to changes in barrel temperature setpoints if the barrel temperature control is within a functional range (i.e., not out of control capability), and the response can be reproducible for a given batch material, product type and operation conditions, e.g., feedrate, motor speed, and the like. This reproducibility illustrates the feasibility of automatically controlling batch material extrudate temperatures.

FIG. 6 is a schematic illustrating a ceramic batch material extrudate temperature control system (70), according to one embodiment disclosed herein. A desired (or target) batch temperature or temperature range (72) is selected and entered in to the system. A master controller (78) receives input through junction (74) on the temperature of the batch material (92) gathered either directly or indirectly by monitoring the temperature of the batch material or a portion of the extruder (90) proximal to the die plate (not shown). The master controller (78) sets a barrel temperature setpoint (80) and regulates the operation via a signal (80), sent to junction (82) as an input of a slave controller (86) that itself controls cooling flow (88) to at least one barrel (not shown) of the extruder (90). A temperature sensor on the extruder, located, for example, on the barrel under cooling control (not shown), collects data on the temperature of the extruder body (90) well in front of the die plate and extrudate and provides this information (94) as an input (84) to the slave controller (86) which supplies or withholds the flow of cooling (88) to the extruder barrel (90) as necessary to produce an extrudate with the desired temperature.

Figure 7:
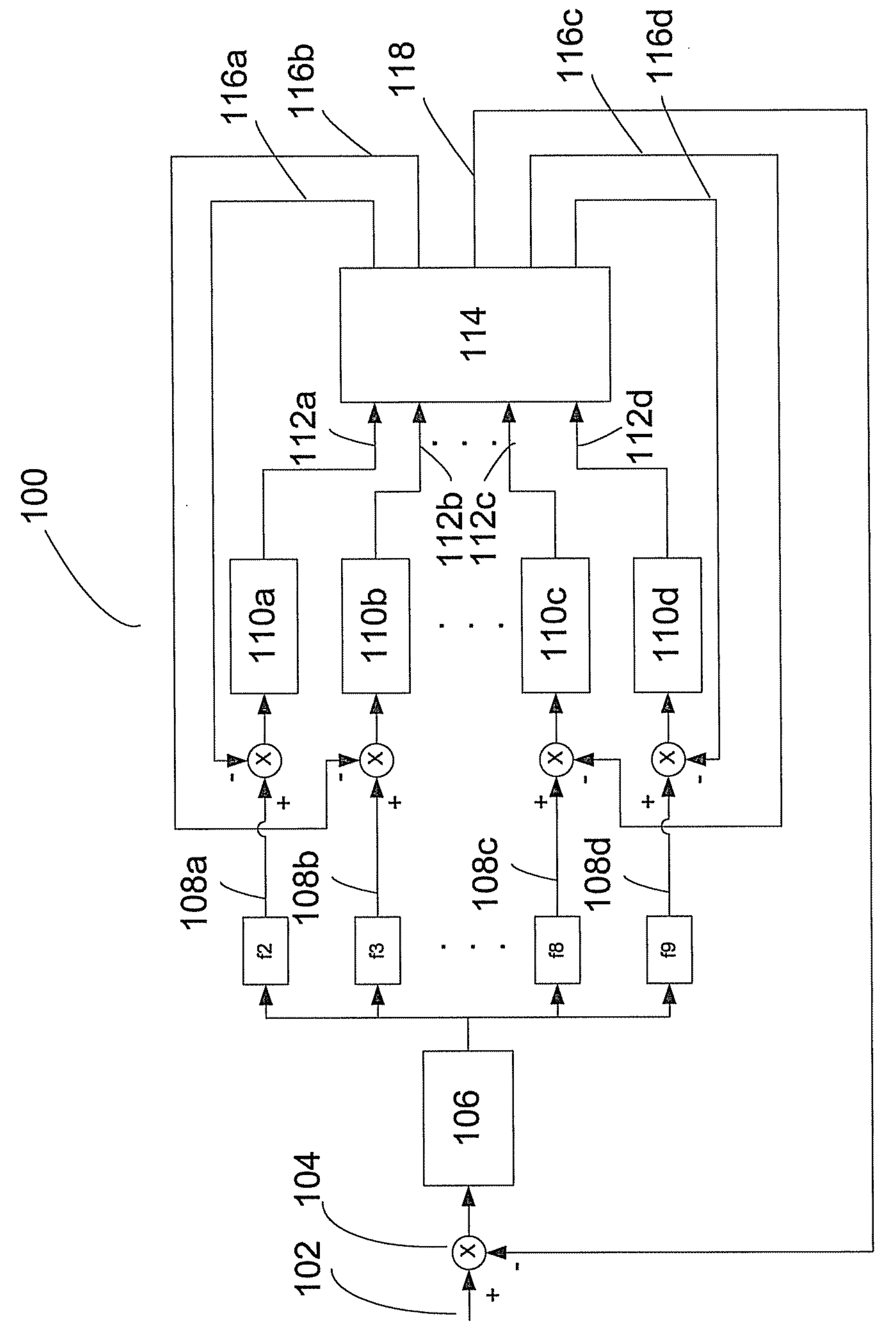
FIG. 7 is a diagram illustrating a batch temperature control system including multiple barrels, each of which may provide cooling to the extruder assembly.

FIG. 7 is a schematic (100) illustrating on embodiment; a dual loop batch temperature control system that includes a single master controller (106) and more than one slave controllers (for example, 110*a*, 110*b*, 110*c*, 110*d*), each of which controls the flow of cooling (112*a*, 112*b*, 112*c*, 112*d*) to specific barrels (not shown) that is part of the extruder (114) assembly. An input (104) into the master controller (106) includes the temperature of the batch material extrudate (118) measure either directly or indirectly proximal to the die (not shown) and a batch temperature setpoint or setpoint range (102). Based differences between the setpoint and batch temperature inputs, the master controller (106) selectively activates by signaling (108*a*, 108*b*, 108*c*, 108*d*) at least one of the slave controllers (110*a*, 110*b*, 110*c*, 110*d*), which in turn provides cooling to extruder (114) barrels under their control. Each slave has an associated weighting function (f2, f3, f8, f9). Respectively, these factors adjust for difference in cooling efficiencies between various barrels. Additionally, each slave controller receives temperature information on its respective barrel via barrel temperature sensors transmitted to the slave by temperature reports (116*a*, 116*b*, 116*c*, 116*d*). The control system includes barrel cooling flow rate and cooling valve opening/closing under the controller of respective slave controllers (110*a*, 110*b*, 110*c*, 110*d*).

Referring now to FIG. 8, a batch material extrudate temperature control system (130) similar to the one is shown in FIG. 7. Referring again to FIG. 8, this embodiment further includes an extrusion supervisory controller (132). In this embodiment, the extrusion supervisory controller (132) receives and/or stores input (134) parameters such as batch composition, product type, feed rate, die configuration, ambient temperatures, and the like and processes this input to calculate a batch temperature setpoint (102). The extruder supervisory controller (132) calculates and sends an output (138) directly to the weighting factors (f2, f3, f8 and f9), which can adjust these factors according to various run parameters (134). The supervisory controller (132) also generates and sends a control signal (136) directly to the master controller (106) based on various run parameters (134). The supervisory controller also calculates and outputs a batch temperature setpoint (102) to the master controller (106) through junction (104) which, in turn, controls the slave controllers (110*a*, 110*b*, 110*c*, 110*d*) through barrel weighting functions (f2, f3, f8, and f9) that regulates cooling flow (112*a*, 112*b*, 112*c*, 112*d*) to barrels in the extruder assembly (114).

Still referring to FIG. 8, in one embodiment the supervisory controller 132 also calculates and adjustment to the weighting functions (f2, f3, f8, and f9) and provides them as input 138. The supervisory controller 132 also calculates an adjustment the operation of the master controller (106) and provides the same as an input 136 to the master controller (106) which, in turn regulates the slave controllers (110*a*, 110*b*, 110*c*, 110*d*). The extruder supervisory controller (132) may also generate a series of parameters (140), which is sent to the slave controllers (110*a*, 110*b*, 110*c*, 110*d*) and can be used to adjust how they operate. Since the impact of barrel temperature on the batch material extrudate temperature is different for different barrels some weighting functions or factors can be used for different barrels based on the output of the extrudate temperature controller. Also, the weighting functions and parameters inside the extrudate temperature controller 130, as well as factors within individual barrel temperature controllers, are process condition dependant. Accordingly, another embodiment is an extrusion temperature supervisor 132 constructed to calculated and transmit specific instructions to various components of the system including the master 106 and slave controllers (110*a*, 110*b*, 110*c*, 110*d*) as well as various weighting functions (f2, f3, f8, f9) for each run based on various factors, including imported run recipe, which includes information about material, product, hardware, process conditions, and the like 134.

EXAMPLES

Referring now to FIG. 1, for example, an extruder (12) may include eight or nine barrels. In this example the batch temperature control is based on automatic temperature control of barrels (2) to barrel (9), where barrel (1) is used for material feeding, barrel (4) is used to create vacuum, and barrel (9) is positioned as the last barrel before the die. In this arrangement setpoint changes at different barrels would have different impacts on the batch material temperature. FIG. 8 shows the architecture of a complete batch temperature control system, where different weighting functions (f2, f3, f8, f9) are used for different barrel temperature control loops. Referring again to FIG. 1, barrels located after the vacuum barrel (4) may be used to deliver cooling to the extrude necessary to control batch material. The amount of cooling required depends on a number of factors such as backup length (which is determined by the screw design), batch material properties, the material feed rate, ambient temperature, barrel configuration and heat capacity, and the like. Different weighting factors (e.g. f2, f3, f8 and f9) can be used based on the response of batch material to changes of each individual barrel temperature setpoints. In this arrangement, controlling the temperature of barrels (2, 3 and 4) does not directly affect the temperature of the batch material due in part to the distance between barrels (2, 3 and 4) and the die (24). Accordingly, these barrel temperature setpoints may be adjusted as necessary in order to optimize the cooling capability of the barrels so as to maintain batch temperatures within a specific temperature range. Thus, depending on the cooling efficiency of barrels' position after the vacuum barrel, their setpoints may be adjusted differently from run to run.

We also observed in our experiments and production runs that different materials and product types exhibit different system dynamics with respect to heating and cooling as well a extruder performance. Accordingly, it is difficult, if not impossible, to develop a universal set of control parameters, which will work for all conceivable process conditions. In some embodiments disclosed herein this is addressed by providing an extrusion supervisory controller, which can take into account various factors such as the job recipe, product type, material feed rate, die number, and other process setup parameters. Next, the supervisory controller can calculate a set of appropriate control parameters for the batch material temperature controller, barrel temperature controllers, and various weighting functions or factors. The system can be adjusted to accommodate these differences by, for example, adjusting the response of the inner control loop to changes in batch temperatures detected by the outer control loop. A diagram of an extrusion temperature supervisory control system is shown in FIG. 8. In some embodiments, the methods or systems disclosed herein can help to reduce or eliminate the need for the costly reworking of extrusion dies. Thus, in one aspect, a method is disclosed herein of extruding a green ceramic body, the method comprising: providing ceramic precursor batch material containing a cellulosic binder; forcing the batch material through a barrel of an extruder and through an extruder die disposed downstream of the barrel; measuring, within the barrel upstream of the die, a batch material core temperature of the material proximate the center of the barrel, and a batch material peripheral temperature of the material proximate a wall of the barrel; regulating a temperature of the batch material, comprising maintaining a core temperature of the batch material within the barrel upstream of the die, such that the core temperature is between a core temperature lower limit and a core temperature upper limit and the batch material in the extruder barrel is in a first viscosity state in which the batch material is able to flow through the extruder die, wherein the core temperature upper limit corresponds to a second viscosity state in which the batch material ceases to be able to flow through the extruder die. In some embodiments, the batch material exhibits a pressure vs. temperature behavior described by a pressure vs. temperature curve, such as that illustrated in FIG. 4, comprising: a first region (labeled $1^{st}$) having a slope between −30 psi/° C. and +15 psi/° C. and a second region (labeled $2^{nd}$) having a slope of greater than 30 psi/° C. In some embodiments, the pressure in the second region continuously increases with increasing temperature. In some embodiments, the slope in the second region continuously increases with increasing temperature. In some embodiments, the second region has a slope of greater than 30 psi/° C. and less than 300 psi/° C. In FIG. 4, the core temperature upper and lower limits are labeled 50' and 50", respectively.

In some embodiments, the second viscosity state corresponds to a portion of the curve where slope is greater than 300 psi/° C.

In some embodiments, the core temperature of the batch material within the barrel upstream of the die is maintained in a core temperature range which overlaps at least in part with the second region of the pressure vs. temperature curve.

In some embodiments, the peripheral temperature of the batch material within the barrel upstream of the die is maintained in a peripheral temperature range which overlaps at least in part with the first region of the pressure vs. temperature curve.

In some embodiments, the peripheral temperature of the batch material within the barrel upstream of the die is maintained in a peripheral temperature range which overlaps at least in part with the second region of the pressure vs. temperature curve.

The ceramic precursor batch material can be a material which contains one or more ceramic materials, or which forms a ceramic material upon firing or sintering. For example, the ceramic precursor batch material can comprises one or more ceramic-containing-, or one or more ceramic-forming-, material, selected from the group consisting of cordierite, aluminum titanate, titania, mullite, spinel, alumina, silica, ceria, zirconia, zirconium phosphate, calcium aluminate, magnesium aluminate, sapphirine, perovskite, magnesia, spodumene, beta spodumene, silicon carbide, zirconium carbide, titanium carbide, tantalum carbide, tungsten carbide, aluminum nitride, silicon nitride, boron nitride, titanium nitride, zeolite, and combinations and composites thereof.

In some embodiments, the core temperature lower limit is between 25 and 35° C. In some embodiments, the core temperature upper limit is between 30 and 45° C.

In some embodiments, the difference (TC−TP) between the batch material core temperature (TC) and the batch material peripheral temperature (TP) is maintained at not less than −8 and not more than +16° C.

In some embodiments, the difference (TC−TP) between the batch material core temperature (TC) and the batch material peripheral temperature (TP) is maintained at not less than −4 and not more than +16° C.

In some embodiments, the difference (TC−TP) between the batch material core temperature (TC) and the batch material peripheral temperature (TP) is maintained at not less than 0 and not more than +16° C.

In some embodiments, the difference between the core temperature upper limit and the core temperature lower limit is between 4 and 8° C.

In some embodiments, the step of regulating the temperature of the batch material comprises regulating heat transfer between the extruder barrel and the batch material. In some embodiments, the step of regulating the temperature of the batch material further comprises regulating the heat transfer between an extruder screw and the batch material; in some of these embodiments, the batch material is heated via the extruder screw.

In some embodiments, the step of regulating the temperature of the batch material further comprises maintaining the batch material peripheral temperature between a peripheral temperature lower limit and a peripheral temperature upper limit. In some embodiments, the peripheral temperature upper limit is lower than the core temperature upper limit. In some embodiments, the peripheral temperature lower limit is lower than the core temperature lower limit. In some embodiments, the peripheral temperature upper limit is lower than the core temperature lower limit. In some embodiments, the peripheral temperature upper limit is higher than the core temperature lower limit. In some embodiments, the peripheral temperature lower limit is between 19 and 30° C. In some embodiments, the peripheral temperature upper limit is between 30 and 45° C. In some embodiments, the core temperature lower limit is between 20 and 35° C. In some embodiments, the core temperature upper limit is between 30 and 70° C. In some embodiments, the core temperature upper limit is between 30 and 45° C. In some embodiments, the peripheral temperature lower limit is between 20 and 30° C., the peripheral temperature upper limit is between 30 and 35° C., the core temperature lower limit is between 30 and 35° C., and the core temperature upper limit is between 35 and 40° C. In some embodiments, the difference between the peripheral temperature upper limit and the peripheral temperature lower limit is between 4 and 10° C. In some embodiments, the ceramic precursor batch material is a cordierite-forming batch material, and the difference between the core temperature upper limit and the core temperature lower limit is between 4 and 8° C., and the difference between the peripheral temperature upper limit and the peripheral temperature lower limit is between 4 and 10° C. In some embodiments, the ceramic precursor batch material is a aluminum titanate-forming batch material, and the difference between the core temperature upper limit and the core temperature lower limit is between 4 and 8° C., and the difference between the peripheral temperature upper limit and the peripheral temperature lower limit is between 4 and 10° C. In some embodiments, the batch material peripheral temperature is maintained at greater than or equal to 20° C. and less than or equal to 45° C., and the batch material core temperature is maintained at greater than or equal to 25° C. and less than or equal to 65° C. In some embodiments, the batch material peripheral temperature is maintained at greater than or equal to 27° C. and less than or equal to 35° C., and the batch material core temperature is maintained at greater than or equal to 25° C. and less than or equal to 65° C. In FIG. 4, the peripheral temperature upper and lower limits are labeled 52' and 52", respectively.

It will be apparent to those skilled in the art that various modifications and variations can be made to the present invention without departing from the spirit and scope of the invention. Thus, it is intended that the present invention cover the modifications and variations of these inventions provided that they come within the scope of the appended claims and their equivalents.

What is claimed is:

1. A method for controlling a shape of a ceramic precursor extrudate, the method comprising:

selecting at least one of a predetermined core temperature of the extrudate, a predetermined skin temperature of the extrudate, and a predetermined flow rate of the extrudate, wherein a difference between the predetermined core temperature and the predetermined skin temperature is selected to be within an extrudate temperature range;

forming the extrudate by extruding ceramic precursor batch material through a barrel of an extruder and through an extruder die disposed at an outlet of the extruder, a barrel temperature capable of being regulated by a barrel coolant flow;

measuring a batch material temperature of the material within the extruder upstream of the die;

measuring the barrel temperature;

determining a batch material temperature setpoint;

determining a barrel temperature setpoint based on the measured batch material temperature and the determined batch material temperature setpoint as inputs, and without a batch material pressure as an input;

determining at least one of a barrel coolant flow setpoint and a valve position based on the determined barrel temperature setpoint and the measured barrel temperature; and regulating heat transfer between the barrel and the batch material within the extruder by adjusting the barrel coolant flow based on the at least one of the determined barrel coolant flow setpoint and the valve position to achieve at least one of the predetermined core temperature of the extrudate, the predetermined skin temperature of the extrudate, and the predetermined flow rate of the extrudate, wherein the heat transfer is regulated sufficiently to maintain a difference between the core temperature of the extrudate and the skin temperature of the extrudate to be within the extrudate temperature range.

2. The method of claim 1, wherein the difference between the core temperature of the extrudate and the skin temperature of the extrudate is not less than 1° C. and not more than 3° C.

3. The method of claim 1, wherein the predetermined core temperature of the extrudate is selected to be within a first temperature range, and wherein the heat transfer is regulated sufficient to maintain a core temperature of the extrudate to be within the first temperature range.

4. The method of claim 1, wherein the predetermined skin temperature of the extrudate is selected to be within a second temperature range, and wherein the heat transfer is regulated sufficient to maintain a skin temperature of the extrudate to be within the second temperature range.

5. The method of claim 1, wherein the predetermined flow rate of the extrudate is selected to cause a center flow rate of the extrudate exiting a center portion of the die to be greater than an outer flow rate of the extrudate exiting an outer portion of the die, and wherein the heat transfer is regulated sufficient to cause the center flow rate of the extrudate exiting the center portion of the die to be greater than the outer flow rate of the extrudate exiting the outer portion of the die.

6. The method of claim 1, wherein the predetermined flow rate of the extrudate is selected to cause a center flow rate of the extrudate exiting a center portion of the die to be lesser than an outer flow rate of the extrudate exiting an outer portion of the die, and wherein the heat transfer is regulated sufficient to cause the center flow rate of the extrudate exiting the center portion of the die to be lesser than the outer flow rate of the extrudate exiting the outer portion of the die.

7. The method of claim 1, wherein the barrel temperature setpoint is an output of a master controller, and the batch material temperature and the batch material temperature setpoint are provided as inputs to the master controller.

8. The method of claim 1, wherein the at least one of the barrel coolant flow setpoint and the valve position is an output of a slave controller, and the barrel temperature setpoint and the measured barrel temperature are provided as inputs to the slave controller.

9. The method of claim 1, wherein the batch material temperature setpoint is an output of a supervisory controller.

10. The method of claim 9, wherein the supervisory controller receives process inputs.

11. The method of claim 10, wherein the process inputs comprise at least one of: (i) composition of the batch material, (ii) feedrate of the batch material, (iii) extrudate geometry, or (iv) die characteristics.

12. The method of claim 9, wherein the supervisory controller provides at least one of: the batch material temperature setpoint, (ii) master controller parameters, (iii) slave controller parameters, or (iv) barrel weighting factors.

13. The method of claim 1, wherein the extruder is provided with a plurality of barrel coolant flows.

14. The method of claim 1, wherein the batch material temperature is determined by measuring a temperature of a structure proximate the batch material within the extruder.

15. The method of claim 1, wherein the batch material temperature setpoint is determined from measurements of a core temperature and a skin temperature of the extrudate.

16. A method for controlling a shape of a ceramic precursor extrudate, the method comprising:

selecting at least one of a predetermined core temperature of the extrudate, a predetermined skin temperature of the extrudate, and a predetermined flow rate of the extrudate, wherein the predetermined core temperature of the extrudate is selected to be within a temperature range of not less than 31° C. and not more than 37° C.;

forming the extrudate by extruding ceramic precursor batch material through a barrel of an extruder and through an extruder die disposed at an outlet of the extruder, a barrel temperature capable of being regulated by a barrel coolant flow;

measuring a batch material temperature of the material within the extruder upstream of the die;

measuring the barrel temperature;

determining a batch material temperature setpoint;

determining a barrel temperature setpoint based on the measured batch material temperature and the determined batch material temperature setpoint as inputs, and without a batch material pressure as an input;

determining at least one of a barrel coolant flow setpoint and a valve position based on the determined barrel temperature setpoint and the measured barrel temperature; and regulating heat transfer between the barrel and the batch material within the extruder by adjusting the barrel coolant flow based on the at least one of the determined barrel coolant flow setpoint and the valve position to achieve at least one of the predetermined core temperature of the extrudate, the predetermined skin temperature of the extrudate, and the predetermined flow rate of the extrudate, wherein the heat transfer is regulated sufficiently to maintain the core temperature of the extrudate to be within the temperature range.

17. A method for controlling a shape of a ceramic precursor extrudate, the method comprising selecting at least one of a predetermined core temperature of the extrudate, a predetermined skin temperature of the extrudate, and a predetermined flow rate of the extrudate, wherein the predetermined skin temperature of the extrudate is selected to be within a temperature range of not less than 27° C. and not more than 34° C.;

forming the extrudate by extruding ceramic precursor batch material through a barrel of an extruder and through an extruder die disposed at an outlet of the extruder, a barrel temperature capable of being regulated by a barrel coolant flow;

measuring a batch material temperature of the material within the extruder upstream of the die;

measuring the barrel temperature;

determining a batch material temperature setpoint;

determining a barrel temperature setpoint based on the measured batch material temperature and the determined batch material temperature setpoint as inputs, and without a batch material pressure as an input;

determining at least one of a barrel coolant flow setpoint and a valve position based on the determined barrel temperature setpoint and the measured barrel temperature; and regulating heat transfer between the barrel and the batch material within the extruder by adjusting the barrel coolant flow based on the at least one of the determined barrel coolant flow setpoint and the valve position to achieve at least one of the predetermined core temperature of the extrudate, the predetermined skin temperature of the extrudate, and the predetermined flow rate of the extrudate, wherein the heat transfer is regulated sufficiently to maintain a skin temperature of the extrudate to be within the temperature range.

18. A ceramic precursor extrudate control system comprising:

an extruder comprising a barrel and an extruder die disposed at an outlet of the extruder, wherein the extruder is configured to form an extrudate comprising at least one of a predetermined core temperature, a predetermined skin temperature, and a predetermined flow rate by extruding a batch material through the barrel and through the extruder die;

a barrel cooling device configured to provide a barrel coolant flow to the barrel;

a batch material temperature sensor disposed within the extruder upstream of the die and configured to deliver a batch material temperature;

a barrel temperature sensor configured to deliver a barrel temperature;

a master controller configured to receive the batch material temperature from the batch material temperature sensor and a batch material temperature setpoint as inputs, wherein the master controller is further configured to determine a barrel temperature setpoint as an output based on the batch material temperature and the batch material temperature setpoints as inputs, and without a batch material pressure as an input; and a slave controller configured to receive the barrel temperature setpoint determined by the master controller and the measured barrel temperature received from the barrel temperature sensor as inputs, and configured to deliver at least one of a coolant flow setpoint and a valve position as an output, wherein the barrel cooling device is configured to provide the coolant flow to the barrel based on the at least one of the coolant flow setpoint and the valve position to regulate heat transfer between the barrel and the batch material within the extruder to achieve at least one of the predetermined core temperature of the extrudate, the predetermined skin temperature of the extrudate, and the predetermined flow rate of the extrudate.

19. The method of claim 18, further comprising a supervisory controller configured to deliver the batch material temperature setpoint to the master controller.

* * * * *